United States Patent [19]
Chapin

[11] Patent Number: 6,119,289
[45] Date of Patent: Sep. 19, 2000

[54] BED FRAME ASSEMBLY

[75] Inventor: Richard M. Chapin, Mooresville, N.C.

[73] Assignee: Global Furniture, Inc., Mooresville, N.C.

[21] Appl. No.: 09/167,695

[22] Filed: Oct. 7, 1998

Related U.S. Application Data

[60] Provisional application No. 60/062,237, Oct. 16, 1997.

[51] Int. Cl.[7] ............................. A47C 19/00; A47C 23/06
[52] U.S. Cl. .................................. 5/200.1; 5/236.1; 5/296; 5/301; 5/303
[58] Field of Search ........................... 5/238, 236.1, 296, 5/301, 303, 200.1

[56] References Cited

U.S. PATENT DOCUMENTS

| | | |
|---|---|---|
| 59,795 | 1/1866 | Elliot . |
| 77,491 | 5/1868 | Jackson . |
| 105,798 | 7/1870 | Grillet . |
| 230,172 | 7/1880 | Bradish . |
| 460,034 | 9/1891 | Robbins . |
| 616,000 | 12/1898 | Lowry ......................................... 5/238 |
| 1,274,802 | 8/1918 | Spiegel ....................................... 5/296 |
| 2,227,704 | 1/1941 | Collins . |
| 2,247,265 | 6/1941 | Whalen ...................................... 5/296 |
| 2,595,321 | 5/1952 | Anderson ................................... 5/238 |
| 2,648,074 | 8/1953 | Jonas . |
| 2,845,636 | 8/1958 | Iaquinta et al. ............................ 5/296 |
| 3,286,282 | 11/1966 | Cloutier .................................... 5/296 |
| 3,305,880 | 2/1967 | Cloutier .................................... 5/296 |
| 3,702,137 | 11/1972 | Evans . |
| 3,740,776 | 6/1973 | Lazarus . |
| 4,126,208 | 11/1978 | McVeen . |
| 4,126,906 | 11/1978 | Foust . |
| 4,135,266 | 1/1979 | Knoke . |
| 4,148,106 | 4/1979 | Gallien . |
| 4,155,131 | 5/1979 | Harris et al. ............................... 5/296 |
| 4,413,366 | 11/1983 | Whitehead . |
| 4,745,644 | 5/1988 | Pottschmidt . |
| 5,052,063 | 10/1991 | Elmalek et al. ........................... 5/238 |
| 5,500,963 | 3/1996 | Yeh . |

FOREIGN PATENT DOCUMENTS

| | | | |
|---|---|---|---|
| 434024 | 9/1926 | Germany ................................... 5/303 |
| 26544 | 11/1912 | United Kingdom ..................... 5/303 |

*Primary Examiner*—Terry Lee Melius
*Assistant Examiner*—Rodrigo J. Morales
*Attorney, Agent, or Firm*—Alston & Bird LLP

[57] ABSTRACT

A bed assembly which may be easily assembled and disassembled. The bed assembly includes corner posts, bed end structures and siderails. A positive restraining attachment cooperates with the siderails and the corner posts to prevent unintentional removal of the siderails, such as by the application of force beneath the siderails. Crossrails are supported by cleats connected to the siderails. The cleats define a horizontally extending surface upon which the crossrails contact and an angularly oriented surface portion. A bore is defined by the cleat and extends substantially perpendicular to the angularly oriented surface portion. A pin associated with the crossrails is positioned within the bore and cooperates with the angularly oriented surface portion to prevent unintentional dislocation of the crossrails.

24 Claims, 5 Drawing Sheets

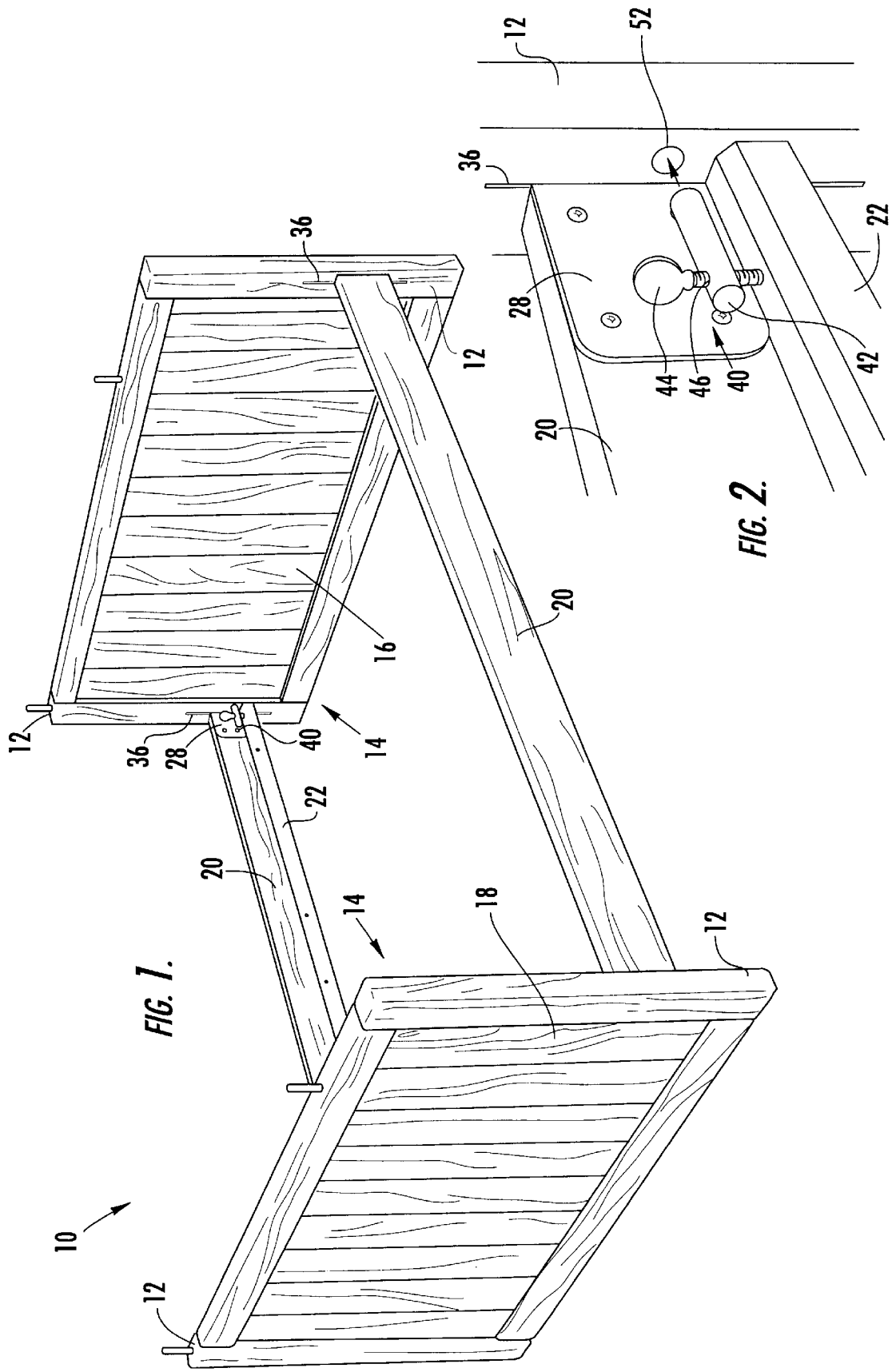

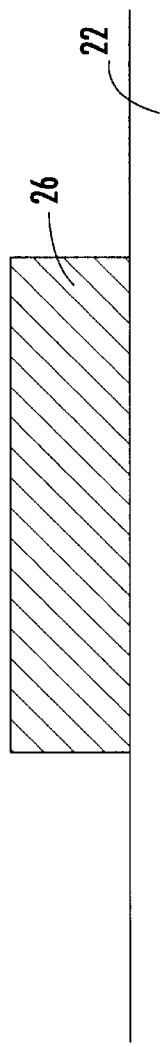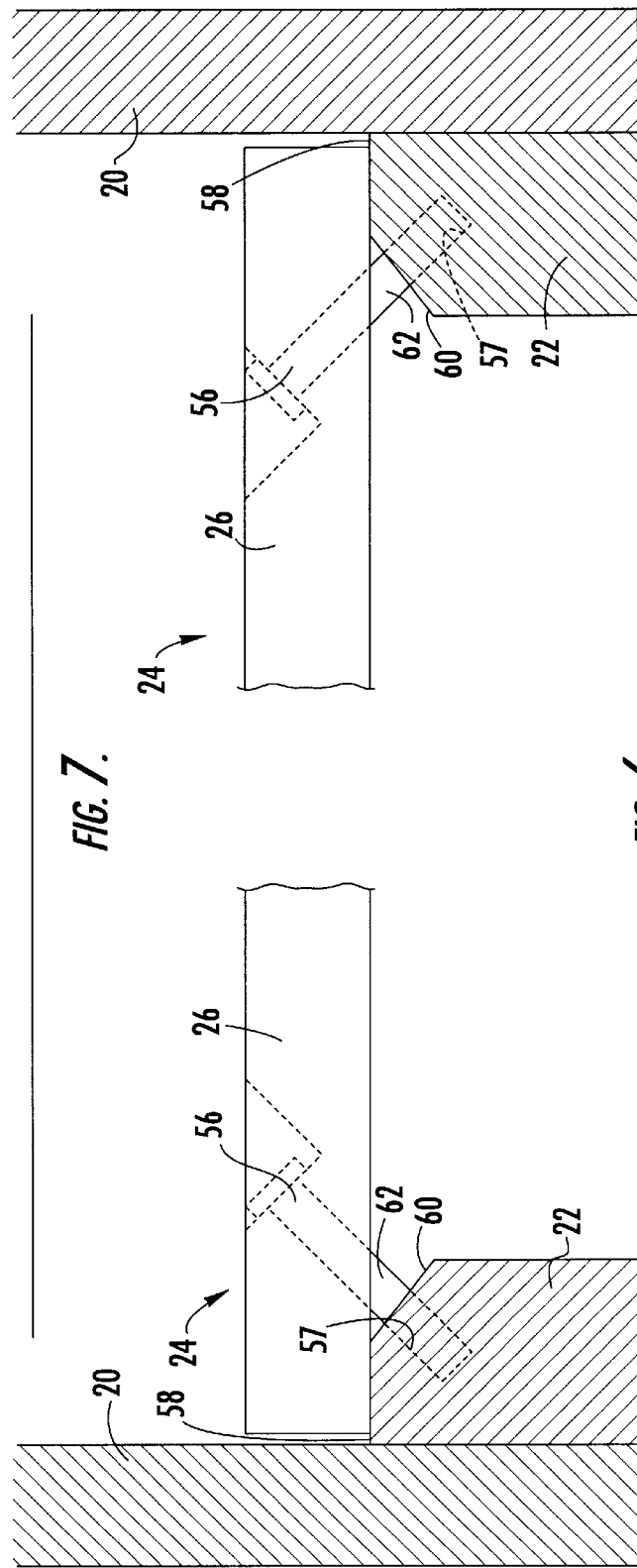
FIG. 7.
FIG. 6.

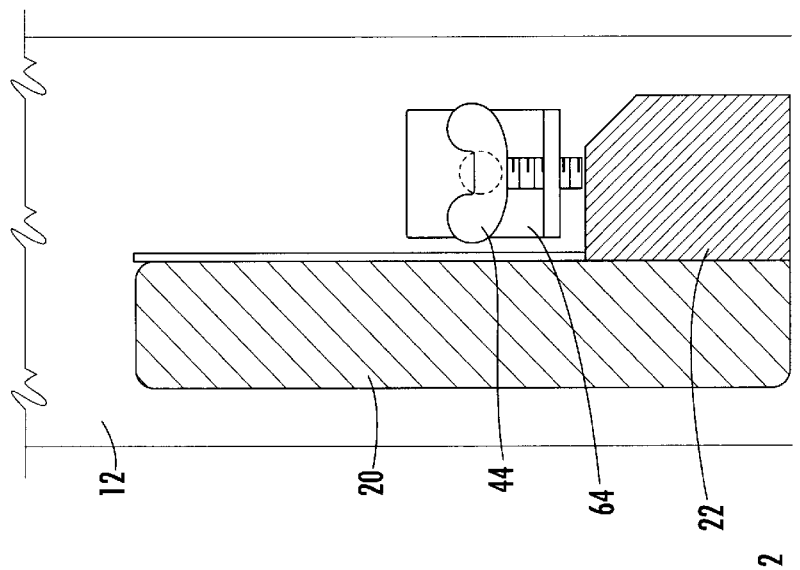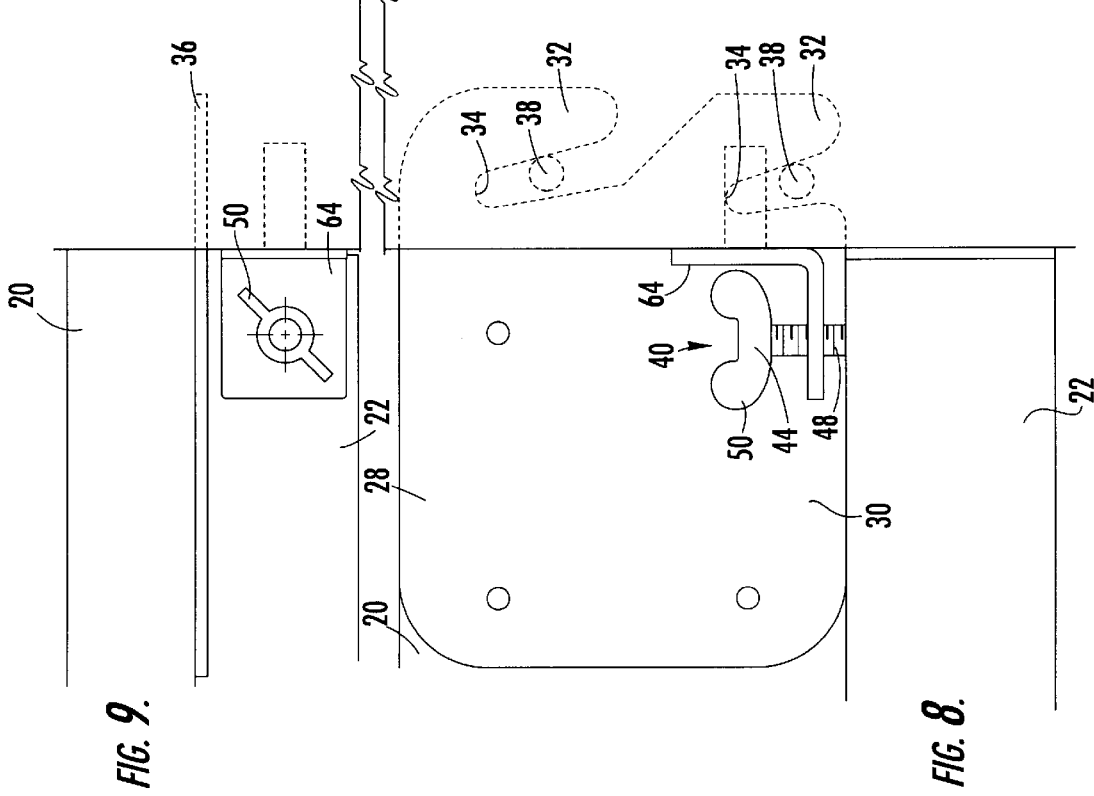

BED FRAME ASSEMBLY

CROSS-REFERENCE TO RELATED APPLICATION

This application claims priority of provisional application Ser. No. 60/062,237, filed Oct. 16, 1997.

FIELD OF THE INVENTION

The present invention is related to a bed assembly, such as for bunk beds, which may be assembled and disassembled without the need for automatic or hand tools.

BACKGROUND OF THE INVENTION

Bunk beds usually include two beds with one positioned either horizontally or perpendicularly over the other. Such beds are often used by children and are used to conserve room space. When assembled, bunk beds must therefore be sturdy and should comply with requisite industry safety specifications such as those provided by ASTM (American Society for Testing and Materials). To encourage compliance therewith, it is desirable to provide a bed assembly which may be easily assembled. If difficult assembly directions are necessary or tools are required which a person may not have on hand, then the safety requirements may not fully be complied with or the bed assembly may be improperly assembled.

It is also desirable, in some instances, to provide a bed assembly which may be readily disassembled such as for transporting or storing the bed assembly. It is often necessary, such as on retail floors, to be able to completely assemble the bed assembly, and have the ability to disassemble the bed assembly without affecting its individual components.

SUMMARY OF THE INVENTION

It is therefore an object of the present invention to provide a bed assembly which may be easily assembled and disassembled.

It is another object of the present invention to provide a bed assembly which may be repeatedly securely assembled and disassembled.

It is a further object of the present invention to provide a bed assembly which encourages compliance with industry recommended safety requirements.

The present invention is directed to a bed assembly which may be easily assembled and disassembled without the use of automatic or hand tools. The bed assembly is also useful for bunk beds which, as defined herein, refers to beds whose foundation is more than 35 inches from the floor.

The bed assembly includes at least four bed posts defining the four corners of the bed assembly. A pair of bed end structures extend between a respective two bed posts so as to define a head and foot of the bed assembly. A pair of siderails extend between a respective two of the corner posts, perpendicular to the bed end structures, so as to define the sides of the bed assembly. The siderails each include a cleat which extends inwardly from the siderail toward the opposing siderail. A foundation, such as for a mattress, is provided and extends between the siderails, perpendicularly thereto. Preferably, at least a pair of elongate crossrails define the foundation.

The siderails are secured to the end structures by a hook-on attachment. The hook-on attachment is defined by a plate which is secured against the siderail and which includes one, and preferably two, downwardly extending hooks. The corner bed posts each define a longitudinal slot open at least along the side of the corner bed post facing the siderail. At least one, and preferably a pair, of pins perpendicularly intersect the slot. The pins may comprise a nail. Accordingly, the hook-on attachment secured to the siderail may be inserted into the post slot wherein downward force applied to the siderail will permit mating of the downwardly extending hooks with the respective pins.

Without further restrainment, upward force applied to the siderail may thereby disengage the downwardly extending hooks from the pins. This is potentially dangerous, particularly with respect to bunk beds wherein one bed is positioned above another. Such bunks beds are often used by children wherein one child sleeps beneath the upper bed and may kick or otherwise push the siderails of the upper bed which may disengage the hook-on attachments from the pins. Accordingly, a positive restraining attachment is provided to positively engage the downwardly extending hooks of the siderails and the pins of the bed corner posts.

The positive restraining attachment cooperates with the corner post and the siderail to prevent the siderail from being unintentionally disengaged from the corner post. More specifically, according to one embodiment of the present invention, the positive restraining attachment is defined by a cylindrical member and manually rotatable member which is positioned to extend perpendicularly thereto. The corner posts each define a bore or other passage which faces the side of the corner post facing the adjacent siderail. The manually rotatable member preferably is defined by a threaded screw having a winged manual grasp and the cylindrical member preferably includes a threaded bore through which the threaded screw extends. Thus, the cylindrical member may be inserted within the bore of the corner post. The winged screw may then be manually tightened by the manual grasp wherein its bottom end contacts the cleat. According to an alternative embodiment, an angle iron is secured to the corner post and defines an aperture for receipt of the manually rotatable screw. According to either embodiment, when the screw is tightened, the positive restraining attachment binds the siderail and prohibits upward movement of the siderail. Thus, the downwardly extending hooks are positively engaged with the pins of the corner posts and the siderails and the corner posts are positively secured without the need for any automatic or hand tools.

The foundation of the bed includes at least one and preferably a plurality of crossrails which extend between the siderails to support a mattress. The crossrails rest along the upper surface of the cleat which is secured to the siderail. The cleat extends inward from the siderail so as to define a right angle therewith and upon which the crossrails are supported. As with the siderails, it is important that the crossrails be positively restrained against the siderails so that any upward force applied thereto will not disengage the crossrails.

Thus, a securing pin is provided. Each of the cleats define a chamfered upper surface defined by a horizontal portion and an angularly oriented portion. The angularly oriented portion defines at least one angular bore for each crossrail provided. The angular bore extends at an angle with respect to the horizontal portion and perpendicular to the angled portion of the chamfered upper surface of the cleat. Each crossrail includes and angular bore which, when positioned upon the cleats so that the angular bores of the crossrail and the siderails are in alignment, extends co-linearly with the bores of the siderails. Thus, a pin, such as one made of steel, may be inserted into the aligned bores to secure the crossrails against the siderails without the need of an automatic or hand tool. Due at least in part to the angular positioning of the pin, upward movement against the crossrails will not dislodge the crossrails from its proper seat against the cleat.

BRIEF DESCRIPTION OF THE DRAWINGS

The foregoing and other objects, features, and advantages of the present invention will be made apparent from the following detailed description of the preferred embodiment of the invention and from the drawings, in which:

FIG. 1 is a perspective view of a bed assembly according to a first embodiment of the present invention;

FIG. 2 is a perspective view of the positive restraining attachment according to the present invention;

FIG. 6 is a cross-sectional view of the crossrails and cleat according to the present invention;

FIG. 7 is an end view thereof;

FIG. 8 is an enlarged, side elevational view of a second embodiment of the present invention;

FIG. 9 is a top plan view thereof; and

FIG. 10 is a front elevational view thereof.

DETAILED DESCRIPTION OF THE DRAWINGS

Figure 3:
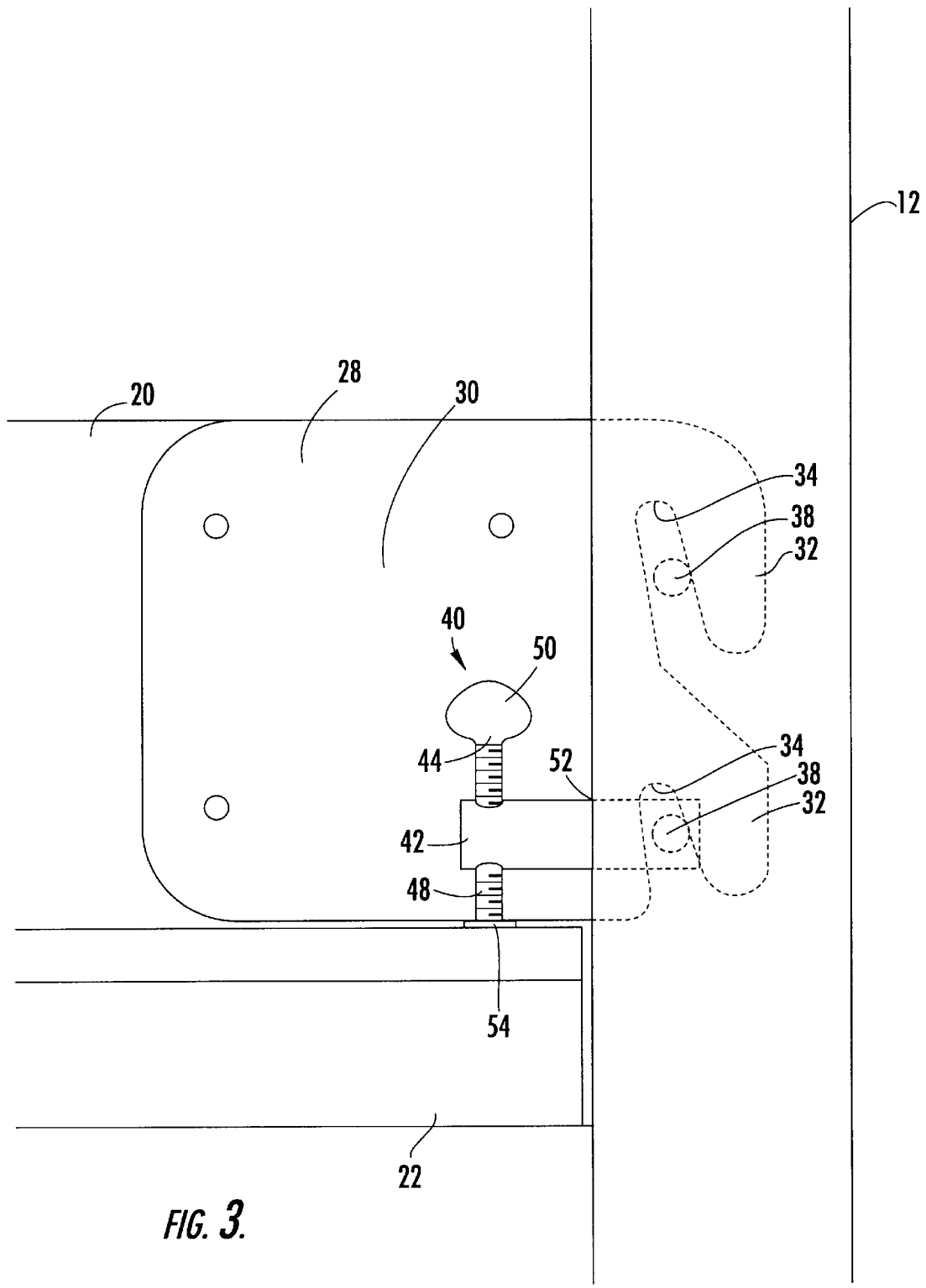
FIG. 3 is an enlarged, side elevational view thereof.
Figure 4:
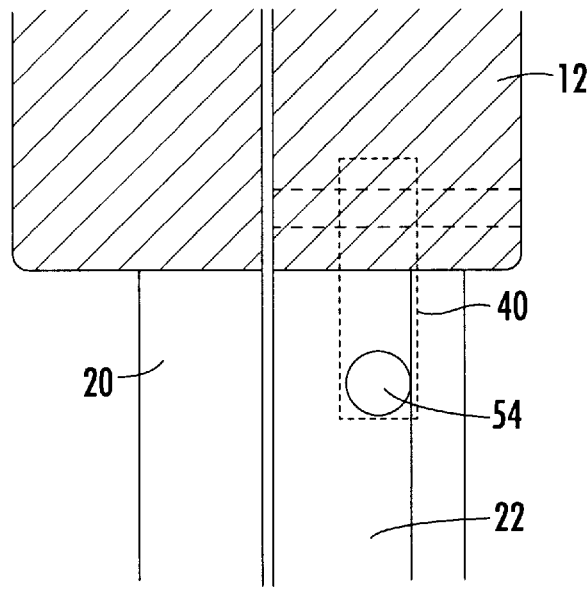
FIG. 4 is a top plan view thereof.

The present invention will now be described more fully in detail with reference to the accompanying drawings, in which preferred embodiments of the invention are shown. This invention should not, however, be construed as limited to the embodiments set forth herein; rather, they are provided so that this disclosure will be thorough and complete and will fully convey the scope of the invention to those skilled in the art.

The bed assembly, shown generally at 10, includes a plurality of bedposts 12, e.g., four bedposts 12, which define the four corners of the bed assembly 10. At least one, and preferably a pair of, bed end structures 14 are provided so as to define a head and a foot of the bed assembly 10. As illustrated in FIG. 1, the bed end structures are defined by a headboard 16 and a footboard. Alternatively, a simple rail may extend between the respective corner posts 12 so as to define the bed end structures 14. Alternatively, a headboard 16 and/or a footboard 18 may be secured to the bed end structures 14.

A pair of siderails 20 extend between a respective two of the corner posts 12 to define the sides of the bed assembly 10. The siderails 20 each include a cleat 22 which extend inwardly from the respective siderail 20 towards the opposing siderail 20. Thus, the cleat 22 extends perpendicularly relative to the siderail 20 to define a seat for receiving a foundation which, as illustrated, is in the form of a crossrail 26. Preferably, at least a pair of crossrails 26 are provided.

The siderails 20 are secured to the respective corner posts 12 on each end thereof by a pair of hook-on attachments 28. The hook-on attachments 28 are defined by a plate 30 having at least one, and preferably a pair, of downwardly extending hooks 32. The downwardly extending hooks 32 are shown in phantom in FIG. 3. The plate portion 30 of the hook-on attachment 28 may be secured to the respective siderail by any known method such as by a plurality of screws. The hook-on attachment 28 preferably is permanently secured to the siderail wherein installation of the bed by the end user will not require installation of the hook-on attachment 28 to the siderail 20. The downwardly extending hooks 32 each define a pin-receiving channel 34.

Each of the corner posts 12 define a longitudinal slot 36, best illustrated in FIGS. 1 and 2, for receipt of the hook-on attachment 28 secured to the siderail 20. Preferably, the longitudinal slot 36 is greater in length than the height of the hook-on attachment 28. At least one and preferably a pair of pins 38 intersect perpendicularly through the longitudinal slot 36. Preferably, the number of pins 38 correlates with the number of downwardly extending hooks 32 of the hook-on attachment 28. The pins 38 are configured to be received within the pin receiving channels 34 of the hook-on attachment 28. Thus, the siderail 20 may be secured to the corner post 12 by the insertion of the hook-on attachment 28 into the longitudinal slot 36 of the respective corner posts 12 wherein downward forces applied to the siderail 20 will engage the pins 38 with the pin-receiving channels 34 defined by the downwardly extending hooks 32 of the hook-on attachment 28. In this position, the siderail 20 is secured to the corner post 12, albeit not positively secured thereto. For instance, if upward force were applied to the underside of the siderail 20 or the cleat 22, the hook-on attachment 28 may become disengaged from the pins 38, enabling the bed assembly 10 to become disassembled. Accordingly, a positive restraining attachment 40 is provided.

The positive restraining attachment 40 includes a cylindrical member 42 and a manually rotatable screw 44 wherein the two are arranged in a perpendicular arrangement. The cylindrical member 42 includes a bore 46 which is configured for receipt of the wing screw 44. Preferably, the bore 46 includes internal threads. The manually rotatable screw 44 as illustrated includes a threaded portion 48 and a manual grasp portion 50 which, preferably, is wing-shaped. Thus, the wing screw 44 may be threaded into the bore 46 of the cylindrical member 42.

Each of the corner posts 12 include a bore 52 which is configured for receipt of the cylindrical member 42 of the positive restraining attachment 40. The bore 52 is best illustrated in FIG. 2. Accordingly, the positive restraining attachment 40 may be inserted into the bore 52. The manual grasp 50 of the wing screw 44 may then be grasped wherein the wing screw 44 may be rotated and threaded through the bore 46 of the cylindrical member 42. As such, the bottom of the wing screw 44 is forced against the cleat 22 and binds the positive restraining attachment 40 in position. As such, the hook-on attachment 28 will be precluded from being forced upward such as by forces applied to the underside of the cleat 22 or the siderail 20, for example.

Figure 5:
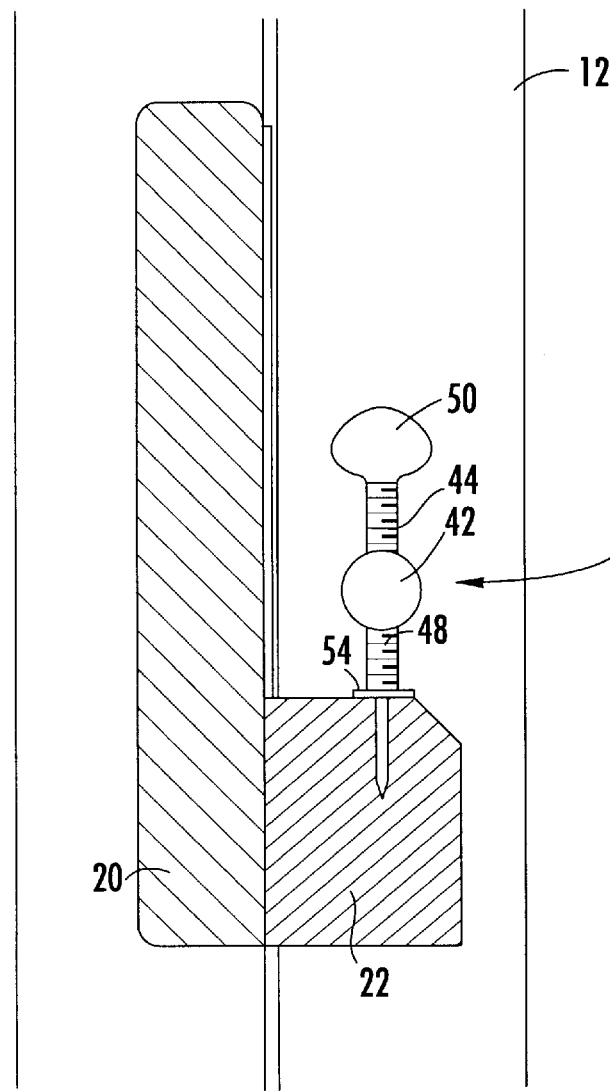
FIG. 5 is a front elevational view thereof.

A contact surface 54 may be provided and preferably is of a harder material than the cleat 22, particularly if the cleat 22 is formed of wood. For example, a nail, as illustrated in FIG. 5, may be provided as the contact surface 54. Thus, the bottom side of the manually rotatable screw 44 may contact the harder surface of the nail head 54 to bind the positive restraining attachment 40 and positively secure the siderails 20 to the corner posts 12.

Thus, the siderails 20 may be secured to the corner posts 12 without the need for any automated or hand tools. The manual grasp 50 of the wing screw 44 may merely be rotated manually. Similarly, the bed assembly 10 may be easily disassembled by merely rotating the manual grasp 50 of the manually rotatable screw 44 in the opposite direction wherein the positive restraining attachment 40 may be released from its binding position and the cylindrical member 42 may be removed from the bore 54 of the corner post 12. The siderail may then be lifted upward to disengage the hook-on attachment 28 from the pins 38 of the corner posts and the siderails 20 may be removed from the corner posts 12.

The positive restraining attachment as thus described may include a member other than the cylindrical member 42 to secure the positive restraining attachment 40 to the corner post 12. For instance, an alternative embodiment illustrated in FIGS. 8-10 includes an angle iron 64 which is secured to the corner post 12 such as by a screw or nail. The wing screw 44 having a manual grasp 50 and threaded portion 48 is inserted through a bore defined by the angle iron 64. The winged screw 44 may then be tightened to secure the positive restraining attachment 40.

Thus, a variety of means for supporting the manually tightened screw 44 may be employed without departing from the scope of the present invention. Alternatively, the positive restraining attachment may be supported by the siderail wherein the manually rotatable screw 44 is tightened to contact the corner post to secure the siderail.

The bed assembly 10 may also include a foundation which may include a plurality of crossrails 26. Preferably, at least two crossrails 26 are provided. Often with conventional beds which are not bunk beds, crossrails are positioned so as to extend between the respective siderails and are not positively restrained thereon. This is unacceptable particularly with bunk beds wherein known forces may be applied to the underside of the crossrails posing the hazards outlined above regarding the siderails. Thus, the present invention provides means which positively secures the crossrails 26 to the siderails 20 and such securing means may be effectuated without the requirement of an automatic or a hand tool.

As best illustrated in FIGS. 6 and 7, the crossrails 26 extend between the siderails 20 and are positioned so as to contact the upper surface of each of the cleats 22. Each of the crossrails 26 define a pair of bores 56 which extend at an angle relative to the length of the crossrail 26. The cleats 22 each include a bore 57 which extends at an angle relative thereto. Preferably, each bore 56 of the crossrail 26 and each corresponding bore 57 of the cleat 22 extend at the same angle wherein and when the two are juxtapositioned, the bores extend co-linearly.

As best illustrated in FIG. 5, the upper surface of the cleat 22 is chamfered and is defined by a horizontal portion 58 and an angularly oriented portion 60. Preferably, the bore 57 of the cleat 22 extends through the angled portion 60 and extends perpendicularly relative thereto. A pin 62, preferably of steel, is provided which may be inserted into the aligned bores 56 and 57 of the crossrails 26 and the cleat 22, respectively. Due, at least in part, to the angular positioning of the pin 62, the crossrail 26 is thereby positively restrained upon the cleat 22 wherein upward forces applied to the underside thereof will not disengage the crossrails 26 from the cleat 22.

Thus, the crossrails 26 may be secured to the siderails 20 without the need of an automatic or a hand tool. Similarly, to disassemble the crossrails 26, the pin 62 need merely be removed from the respective bores 56 and 57. It is apparent from the above discussion that the same number of bores 57 on the cleat 22 will be provided as the number of crossrails 26.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

What is claimed is:

1. A bed assembly comprising:
    a first and second pair of corner posts, each corner post having a longitudinal axis and defining a longitudinal slot extending parallel to the longitudinal axis of said corner post and including at least one pin extending horizontally within said longitudinal slot, substantially perpendicular to the longitudinal axis of said corner post;
    a pair of bed end structures, one extending between said first pair of corner posts and one extending between said second pair of corner posts;
    at least one siderail extending between one corner post of said first pair of corner posts and one corner post of said second pair of corner posts, substantially perpendicular to said bed end structures;
    a hook-on attachment secured to an end of said siderail for mating with a respective one of said at least one corner post pins; and
    a positive restraining attachment including a cylindrical member and a screw for cooperating with said at least one siderail and a respective one of said corner posts for limiting relative movement between said hook-on attachment and said at least one corner post pin and preventing unintentional dislocation of said siderail.

2. A bed assembly according to claim 1 wherein said hook-on attachment defines at least one downwardly extending hook for receiving a respective one of said at least one corner post pins.

3. A bed assembly according to claim 2 wherein said hook-on attachment defines a pair of downwardly extending hooks and each of said corner posts includes a pair of said corner post pins wherein each of said downwardly extending hooks cooperates with a respective corner post pin of said pair of corner post pins.

4. A bed assembly according to claim 1 wherein each end of said at least one siderail supports a hook-on attachment.

5. A bed assembly according to claim 1 comprising a pair of said siderails.

6. A bed assembly according to claim 1 wherein said at least one siderail includes a cleat which extends parallel thereto and which defines a horizontally extending contact surface for cooperating with said positive restraining attachment.

7. A bed assembly according to claim 6 wherein said contact surface is formed of material different than material forming said siderail.

8. A bed assembly according to claim 6 wherein said cylindrical member mates with a respective one of said corner posts and said screw cooperates with said cleat to urge against said contact surface.

9. A bed assembly according to claim 1 wherein at least one of said corner posts of said first and second pair of corner posts defines a bore for receipt of said cylindrical member.

10. A bed assembly according to claim 6 wherein said bed assembly includes a pair of said siderails and said bed assembly further comprises at least one crossrail extending between said pair of siderails.

11. A bed assembly according to claim 10 wherein said cleat further defines a horizontal portion upon which said crossrail is supported and an angularly oriented portion.

12. A bed assembly according to claim 11 wherein said angularly oriented portion defines a bore extending perpendicular to a surface thereof.

13. A bed assembly according to claim 12 wherein said bed assembly further includes a pin associated with said crossrail which is positioned within said siderail bore wherein said pin cooperates with said cleat to secure said crossrail on said siderail.

14. A bed assembly according to claim 13 wherein said crossrail defines an angularly oriented bore which extends co-linearly with said siderail bore and said pin extends within said crossrail and siderail bores.

15. A bed assembly comprising:

a first and second pair of corner posts;

a pair of bed end structures, one extending between said first pair of corner posts and one extending between said second pair of corner posts;

a pair of siderails, each extending between one corner post of said first pair of corner posts and one corner post of said second pair of corner posts, substantially perpendicular to said bed end structures and each comprising a cleat which includes an angularly oriented surface portion which defines a bore extending perpendicular thereto and a horizontally extending contact surface;

at least one crossrail extending between said pair of siderails; and at least one pin associated with at least one of said at least one crossrail which is positioned within said siderail bore wherein said pin cooperates with said angularly oriented surface portion of said siderail to secure said crossrail to said siderail.

16. A bed assembly according to claim 15 wherein said contact surface is formed of material different than material forming said cleat.

17. A bed assembly according to claim 15 wherein said at least one crossrail defines an angularly oriented bore which extends co-linearly with said siderail bore and said pin extends within said crossrail and siderail bores.

18. A bed assembly according to claim 15 wherein each of said corner posts has a longitudinal axis and defines a longitudinal slot extending parallel to the longitudinal axis of said corner post and include a pin extending horizontally within said longitudinal slot, substantially perpendicular to the longitudinal axis of said corner post and said bed assembly further comprises a hook-on attachment secured to an end of each siderail of said pair of siderails for mating with a respective one of said corner post pins.

19. A bed assembly according to claim 18 wherein said hook-on attachment defines at least one downwardly extending hook for receiving a respective one of said corner post pins.

20. A bed assembly according to claim 18 wherein each end of each siderail of said pair of siderails supports a hook-on attachment.

21. A bed assembly according to claim 15 further comprising a positive restraining attachment having a downwardly urging member, said positive restraining attachment urging against a horizontal surface of said at least one siderail and a vertical surface of a respective one of said corner posts for limiting relative movement between said hook-on attachment and said corner post pin and preventing unintentional dislocation of said siderail.

22. A bed assembly according to claim 21 wherein said positive restraining attachment includes a cylindrical member and said downwardly urging member is a screw wherein said cylindrical member mates with a respective one of said corner posts and said screw cooperates with said cleat to urge against said contact surface.

23. A bed assembly according to claim 22 wherein said corner post defines a bore for receipt of said cylindrical member.

24. A bed assembly according to claim 21 wherein said positive restraining attachment includes an angle iron and said downwardly urging member is a screw wherein said angle iron mates with said corner post and said screw urges against said contact surface.

* * * * *